T. URDAHL.
Binder's Attachments for Harvesters.
No. 144,715. Patented Nov. 18, 1873.
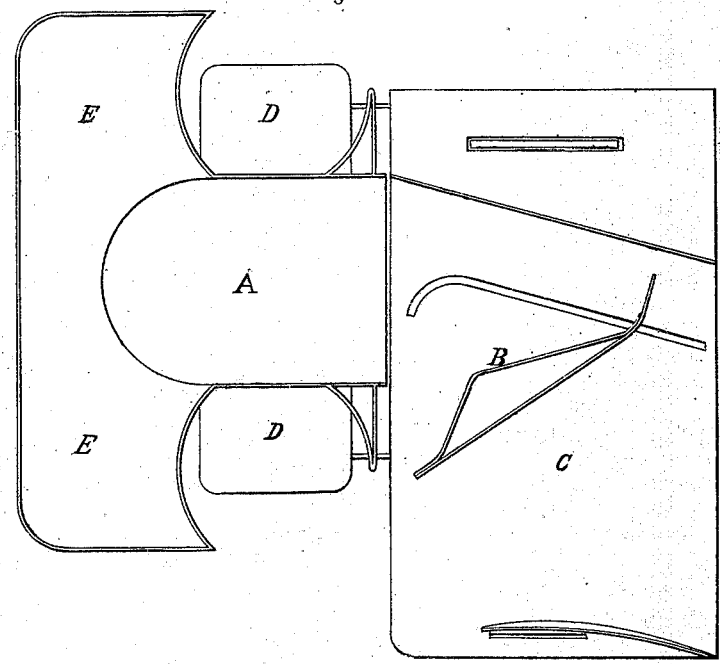
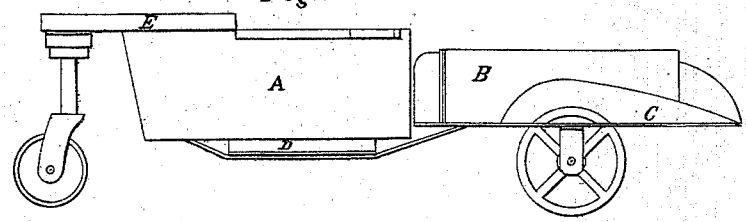
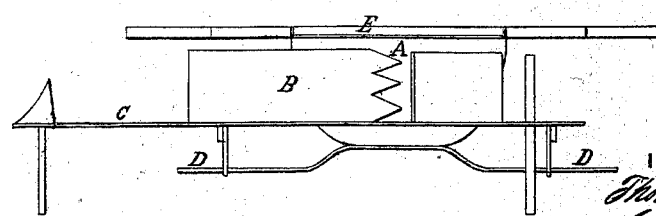

UNITED STATES PATENT OFFICE.

THOMAS URDAHL, OF CROSS PLAINS, ASSIGNOR TO SIMEON MILLS, OF MADISON, WISCONSIN.

IMPROVEMENT IN BINDERS' ATTACHMENTS FOR HARVESTERS.

Specification forming part of Letters Patent No. 144,715, dated November 18, 1873; application filed August 22, 1872.

CASE B.

*To all whom it may concern:*

Be it known that I, THOMAS URDAHL, of Cross Plains, Dane county, Wisconsin, have invented certain Improvements in Harvesting-Machines, of which the following is a specification:

This invention consists of a grain or gavel box (marked A) to be attached to or used in connection with an automatic reaper or harvesting-machine to receive the cut grain. The box is constructed oblong in shape, without top, and open at the front end. Through the opening at the front end the cut grain is thrust into the box by the automatic rake B as it sweeps the gavel from the platform C of the reaping-machine. The box is flanked on each side at or near the bottom with a step, D D, upon which the binders are carried while binding. There is also attached to the box, at the top of the rear part, a shelf or table, E, upon which binders rest the bundles after they are lifted from the box in the process of binding.

The box, with its appendages, as herein described, when in use, is designed to be mounted upon a caster or wheels, and attached to and drawn at the rear end or side of the platform of a grain-reaper or harvesting-machine, that handles or delivers the cut grain with an automatic rake, for the purpose of receiving, retaining, and carrying the gavel or bundle when so delivered to suit the convenience of the binder and for greater facility of handling in the process of binding.

Having thus described the improvement, what is claimed as new is—

In combination with the grain-platform the binding-carriage hinged thereto, consisting of the gavel-box or receiver A, having the binders' stands D secured to its opposite sides, the binding-table E secured upon its rear end, and the supporting wheel also attached to said end, substantially as shown and described.

To the above specification of my invention I have set my hand this 10th day of August, 1872.

THOMAS URDAHL.

Witnesses:
SIMEON MILLS,
CHARLES M. PALMER.